Nov. 1, 1927.  B. F. JANCKE  1,647,364
ELECTRONIC DEVICE
Filed Oct. 8, 1925
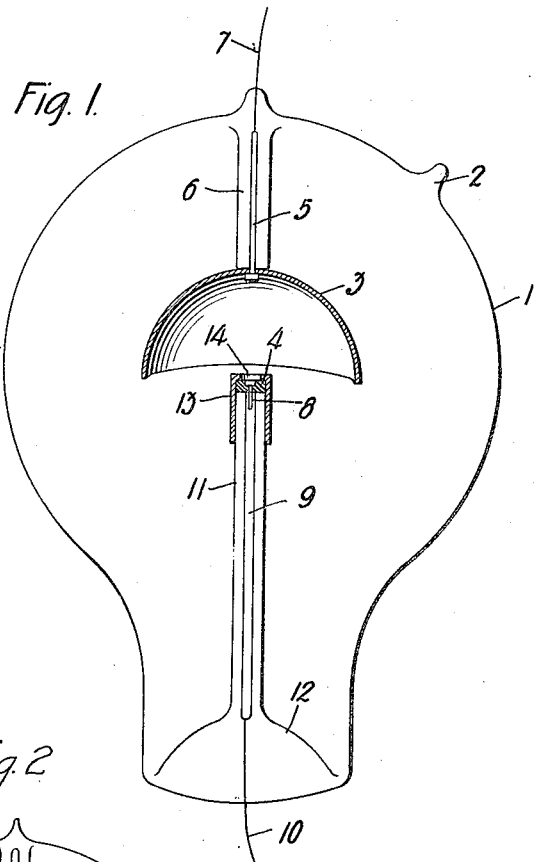
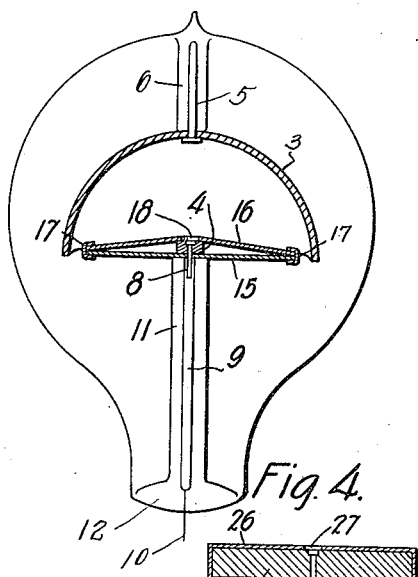
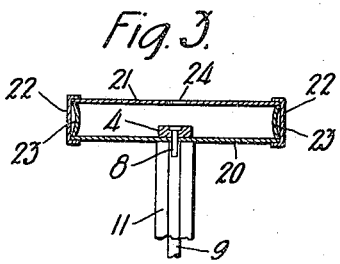
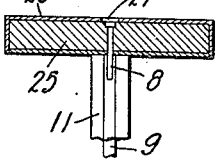
Inventor
B. F. Jancke
by Pamenwich
his Atty Patented Nov. 1, 1927.

1,647,364

UNITED STATES PATENT OFFICE.

BENNO F. JANCKE, OF BROOKLYN, NEW YORK, ASSIGNOR TO MANHATTAN ELECTRICAL SUPPLY COMPANY, INCORPORATED, OF NEW YORK, N. Y., A CORPORATION OF MASSACHUSETTS.

ELECTRONIC DEVICE.

Application filed October 8, 1925. Serial No. 61,228.

This invention relates to electronic devices and particularly to improvements in alternating current rectifiers of the type described in a copending application of Lewis S. Baker, Serial No. 61,016, filed October 7, 1925.

In said application a rectifier is disclosed in which a carbon electrode is provided substantially at the focal point of a hemispherical aluminum electrode, the lead-in wire of said carbon electrode being protected from electronic bombardment by means of a mica disc.

In rectifiers it is of prime importance that a minimum of current pass during the reverse cycle and for this reason one of the electrodes must be of small size as compared with the other electrode. If carbon is used as one of the electrodes, its size cannot be reduced below a point where its mounting would be commercially impracticable. Furthermore, a carbon or similar electrode of an extremely small size would be shortly destroyed by the electronic bombardment to which it is subjected.

In accordance with the present invention the reverse current of a rectifier is reduced to a negligible amount irrespective of the relative sizes of the electrodes. In the present embodiment this is accomplished by blocking the passage of electrons to all but a small surface of one of the electrodes. The barrier that serves for this purpose should be insulated from the electrode or be made of insulating material, e. g., mica, porcelain, or the like. This barrier should be so mounted that it serve also in protecting the lead-in wire of the electrode.

In order more clearly to set forth the nature of my invention I shall describe four exemplifications thereof which are illustrated in Figs. 1–4 of the drawings. Fig. 1 shows a rectifier in side elevation, partly in section, and Figs. 2–4 show variations in the manner of mounting the barrier.

In the embodiment illustrated in Fig. 1, a glass envelope, which may be exhausted at 2, encloses a hemispherical aluminum electrode 3 and a carbon electrode 4. The envelope 1 is filled with neon or other monatomic gas at suitable pressure. The aluminum electrode 3 is suspended from an aluminum rivet 5 which is embedded in a glass arbor 6 depending from the top of bulb 1. Outside connection with electrode 3 may be had through a lead-in wire 7. The carbon electrode 4 is a cylinder of small diameter. It is positioned outside of the hemisphere 3 at substantially the focal point thereof. A small rivet 8 embedded in the carbon is fastened to an aluminum rod 9 in which a lead-in wire 10 terminates. The rod 9 is surrounded by a glass arbor 11 projecting from seal 12. The head of rivet 8 should be below the top surface of the electrode 4.

The carbon electrode, as well as part of the arbor 11, is surrounded by a sleeve 13 of porcelain or the like. At the top of this sleeve an orifice 14 is provided which exposes a small section of the carbon electrode to the aluminum electrode 3.

In the modification shown in Fig. 2, the carbon electrode is surrounded by two mica discs 15 and 16, the edges of which are clamped together by means of a ring 17. The lower disc 15 is clamped between the lower surface of the carbon electrode 4 and the rod 9. The upper disc 16 lies on the top of the carbon electrode and exposes a small area thereof through an orifice 18.

The arrangement shown in Fig. 3 is like the one just described, except that the carbon electrode is held within a cylindrical space enclosed by mica discs 20 and 21, the edges of which are clamped by a ring 22 against a spacer 23. The upper disc 21 is perforated at 24.

In Fig. 4 a large cylindrical carbon electrode 25 is provided in the place of the small electrode 4. The electrode is entirely wrapped in a mica sheet 26, or the like, which is perforated at 27 to expose only the desired surface of the carbon.

In all these arrangements, only a small area of the carbon electrode is exposed. Even a small orifice is sufficient to insure that during the useful cycle electrons may crowd on the carbon electrode, which is positively charged at that time. During the reverse cycle, when the carbon is at a negative potential, practically no reverse current exists. The absence of reverse current may be the result of the inability of electrons to escape through the orifice in the mica disc or the porcelain bushing, because such orifice is blocked by positive charges or ions surrounding it. These positive particles may be produced by the ionization of the gas. Furthermore, during the operation of the device, the porcelain sleeve 13, as well as the mica discs shown in Figs. 2 to 4, acquire and keep a positive charge. Since, during the reverse cycle the carbon is negatively charged, the positive charges existing in or around the mica or porcelain barriers will be attracted towards the carbon and aid in blocking the orifice.

The carbon electrode may be of any size suitable from a manufacturing standpoint and owing to its large size, will readily dissipate heat that may be developed during electronic bombardment.

The porcelain sleeve, as well as the mica discs or wrappers, also protect the glass arbor 11 against sputtered metallic particles, the mica discs being of substantially the same diameter as the aluminum hemisphere.

What I claim is:

1. In a device of the character described, a gas-filled airtight envelope, a hemispherical aluminum electrode within said envelope, a carbon electrode in said envelope, means for mounting said carbon electrode near the focus of said aluminum electrode, an insulating barrier covering part of the carbon surface exposed to said aluminum electrode, a leading-in wire for said carbon electrode, insulation surrounding said leading-in wire, and means for mounting said barrier to protect said insulation from sputtered metallic particles.

2. In a device of the character described, an airtight envelope, a hemispherical electrode in said envelope, a second electrode within said envelope, means for supporting said second electrode substantially at the focus of said hemispherical electrode, a barrier of substantially the same diameter as said hemispherical electrode provided on top of said second electrode and having an orifice through which a portion of the surface of said second electrode is exposed, and a barrier below said second electrode.

3. In a device of the character described, an airtight envelope filled with a monatomic gas, a hemispherical aluminum electrode in said envelope, a carbon electrode within said envelope, means for supporting said carbon electrode substantially at the focus of said aluminum electrode, a disc of substantially the same diameter as said aluminum electrode provided on top of said carbon electrode and having an orifice through which a portion of the carbon surface is exposed, another disc below said carbon electrode of the same diameter as the first mentioned disc, and means for clamping together the edges of said discs.

4. In a current rectifier, an airtight envelope filled with neon, a hemispherical aluminum electrode in said envelope, a carbon electrode within said envelope, means for supporting said carbon electrode substantially at the focus of said aluminum electrode, a mica disc of substantially the same diameter as said aluminum electrode provided on top of said carbon electrode and having an orifice through which a portion of the carbon surface is exposed, a mica disc below said carbon electrode of the same diameter as the first mentioned disc, and means for clamping together the edges of said discs.

In testimony whereof, I have signed my name to this specification, this 7th day of October, 1925.

BENNO F. JANCKE.